(12) United States Patent
Bellett et al.

(10) Patent No.: US 11,435,473 B2
(45) Date of Patent: Sep. 6, 2022

(54) PRODUCTION OF SLOPE DEFORMATION MAPS

(71) Applicant: GroundProbe Pty Ltd, Windsor (AU)

(72) Inventors: Patrick T. Bellett, Windsor (AU); Glen Stickley, Windsor (AU)

(73) Assignee: GroundProbe Pty Ltd, Windsor (AU)

( * ) Notice: Subject to any disclaimer, the term of this patent is extended or adjusted under 35 U.S.C. 154(b) by 273 days.

(21) Appl. No.: 16/769,890

(22) PCT Filed: Dec. 19, 2018

(86) PCT No.: PCT/AU2018/051362
§ 371 (c)(1),
(2) Date: Jun. 4, 2020

(87) PCT Pub. No.: WO2019/119041
PCT Pub. Date: Jun. 27, 2019

(65) Prior Publication Data
US 2021/0372790 A1   Dec. 2, 2021

(30) Foreign Application Priority Data
Dec. 19, 2017 (AU) .............................. 2017905066

(51) Int. Cl.
| | | |
|---|---|---|
| *G01S 13/90* | (2006.01) | |
| *G01B 11/16* | (2006.01) | |
| *G01B 15/06* | (2006.01) | |
| *G01B 21/32* | (2006.01) | |
| *G01S 7/41* | (2006.01) | |
| *G01S 7/48* | (2006.01) | |

(Continued)

(52) U.S. Cl.
CPC ........ *G01S 13/9023* (2013.01); *G01B 11/161* (2013.01); *G01B 15/06* (2013.01); *G01B 21/32* (2013.01); *G01S 7/415* (2013.01); *G01S 7/4802* (2013.01); *G01S 13/89* (2013.01); *G01S 17/89* (2013.01)

(58) Field of Classification Search
None
See application file for complete search history.

(56) References Cited

U.S. PATENT DOCUMENTS 4,300,121 A * 11/1981 Fritzsche ................ G01S 13/88
340/928
5,657,003 A * 8/1997 Fuentes ................... G01S 17/50
348/130

(Continued)

OTHER PUBLICATIONS

M. Lassen, "How many is A few?"; posted on the internet at grammarhow.com; retrieved on Apr. 21, 2022. (Year: 2022).*

(Continued)

*Primary Examiner* — Bernarr E Gregory
(74) *Attorney, Agent, or Firm* — Howard & Howard Attorneys LLC

(57) ABSTRACT

A slope stability monitoring apparatus which produces slope deformation maps that preserve measurements from fast moving small areas, slow moving small areas, slow moving large areas and fast moving large areas while minimising the effect of non-wall movement contamination, such as atmosphere and artefacts. Also a method of producing slope deformation maps by deriving a correction factor and applying the correction factor to correct for non-wall movement contamination.

20 Claims, 7 Drawing Sheets

(51) Int. Cl.
*G01S 13/89* (2006.01)
*G01S 17/89* (2020.01)
*G01S 13/00* (2006.01)

(56) References Cited

U.S. PATENT DOCUMENTS

| | | | | |
|---|---|---|---|---|
| 5,950,140 | A * | 9/1999 | Smith | G01S 19/14 |
| | | | | 702/2 |
| 6,583,751 | B1 * | 6/2003 | Ferretti | G01S 13/9023 |
| | | | | 342/25 R |
| 8,154,435 | B2 * | 4/2012 | Pett | G01S 13/9023 |
| | | | | 342/25 R |
| 8,902,099 | B2 * | 12/2014 | Noon | G01S 13/89 |
| | | | | 342/22 |
| 9,927,514 | B2 * | 3/2018 | Giunta | G01S 13/87 |
| 2004/0046690 | A1 * | 3/2004 | Reeves | G01S 13/89 |
| | | | | 342/175 |
| 2005/0057391 | A1 | 3/2005 | Forsley et al. | |
| 2010/0289693 | A1 | 11/2010 | Stickley et al. | |

OTHER PUBLICATIONS

Berardino, et al.: "A New Algorithm for Surface Deformation Monitoring Based on Small Baseline Differential SAR Interferograms"; IEEE Transactions on Geoscience and Remote Sensing, vol. 40, No. 11, Nov. 2002; pp. 2375-2383.

International Search Report and Written Opinion (International Application No. PCT/AU2018/051362); dated Feb. 26, 2019; 7 pages.

International Preliminary Report on Patentability (International Application No. PCT/AU2018/051362); dated May 23, 2019; 17 pages.

* cited by examiner

PRODUCTION OF SLOPE DEFORMATION MAPS

CROSS-REFERENCE TO RELATED APPLICATIONS

This application is a national phase application of International Patent Application No. PCT/AU2018/051362, filed Dec. 19, 2018, which claims priority to AU Patent Application No. 2017905066, filed Dec. 19, 2017, the disclosures of which are hereby incorporated by reference in their entirety.

FIELD OF THE INVENTION

The present invention relates to the field of industrial safety and in particular mine safety. More particularly, the invention relates to a method and apparatus for monitoring slope deformation in open cut and underground mining applications.

BACKGROUND TO THE INVENTION

The Applicant has previously described a Slope Monitoring System based on using interferometric radar measurements of an observed slope. The technique is well described in International Patent Application number PCT/AU2001/01570. In one important application the Slope Stability Radar (SSR) described in PCT/AU2001/001570 is used to monitor rock walls in an open cut mine to detect any dangerous movement that may lead to slope failure.

More recently the Applicant has described a slope monitoring device based on Slope Stability LiDAR (SSL). International Patent Application number PCT/AU2016/050953 describes a laser-based device that is used in a similar manner to the SSR to monitor slope movement in open cut and underground mines.

A Slope Stability Radar or Slope Stability LiDAR fundamentally measures the amount of movement between measurements in a voxel (pixel for 2D radar) on a slope and the range to the voxel. Thus a deformation map is produced that shows voxel by voxel movement of a slope over time from which alerts are generated to warn of impending slope failure.

To achieve maximum safety benefit both the SSR and SSL devices require accurate and reliable measurements. In International Patent Application number PCT/AU2006/001013, the Applicant explained that various disturbances could impact on the accuracy and reliability of the SSR measurements (which will also be the case for SSL). In particular, the disturbances could be classified as short term (such as a truck passing through the field of view) and long term (such as vegetation). The application describes a technique of detecting variation in short-term and long-term coherence values as an indicator of the need for error correction in the movement data. The content of International Patent Application number PCT/AU2006/001013 is incorporated herein by reference.

International Patent Application number PCT/AU2006/001013 also describes a method of correcting for changes in atmospheric conditions. The method relies upon identifying an atmospheric correction region and applying bulk correction based on changes in the atmospheric correction region. The Applicant has found that existing techniques for bulk correction, such as handling changes in atmospheric conditions, could be improved. In fact, the Applicant is aware that some known atmospheric correction techniques have difficulty capturing both small fast moving deformations and large slow moving deformations. Existing techniques are set up to capture one or the other and it is generally true that automatic atmospheric correction techniques can result in the masking or suppressing of some wall movements. This is particularly so for atmospheric effects caused by snow, which existing techniques are unable to handle.

SUMMARY OF THE INVENTION

In one form, although it need not be the only or indeed the broadest form, the invention resides in a slope stability monitoring apparatus comprising:
a Radar or Lidar that records movement data of an observed slope or wall;
a processor that:
corrects the movement data for apparent movement that is not wall or slope related;
processes the corrected movement data to produce deformation maps indicative of movement of the observed slope or wall over time;
generates alarms indicating wall or slope movement above a threshold; and
a display that displays the deformation maps and alarms.
Preferably the movement data is processed interferometrically and the deformation maps are interferometric deformation maps.

In a further form the invention resides in a method of producing a deformation map of a monitored area including the steps of:
recording UnCorrected Deformation data (UCD) of movement data in the monitored area;
spatially averaging the UnCorrected Deformation data (UCD) to produce Background Deformation data (BD) with minimal effect from small area movement;
temporally averaging the Background Deformation data (BD) to produce Background Deformation averaged data (BDa) with primary effect from slow moving large areas;
subtracting the Background Deformation data (BD) from the UnCorrected Deformation data (UCD) to produce Background Subtracted Deformation data (BSD) with minimal effect from large area movement;
deriving a correction factor from the Background Deformation averaged data (BDa);
applying the correction factor to produce Corrected Background Deformation averaged data (CBDa);
using the Corrected Background Deformation averaged data (CBDa) with the Background Subtracted Deformation data (BSD) to produce Multiscale Deformation data (MSD); and producing a deformation map from the Multiscale Deformation data (MSD) which shows movement in the monitored area.

Preferably the deformation map is an interferometric deformation map produced from interferometric movement data.

The method may further include temporally averaging the Background Subtracted Deformation data (BSD) to produce Background Subtracted Deformation averaged data (BSDa) with primary effect from slow moving small areas; and deriving the correction factor from the Background Deformation averaged data (BDa) and the Background Subtracted Deformation averaged data (BSDa).

The step of deriving the correction factor may include applying a mask to remove outlier data from the Background Deformation averaged data (BDa) and/or Background Subtracted Deformation averaged (BSDa) data.

In a further form the method may be recursive with multiple steps of spatial averaging with each spatial average averaging over a different area, and multiple steps of temporal averaging with each temporal average occurring over a different time period.

In a yet further form the invention resides in a method of producing a deformation map of a monitored area by spatially averaging over at least two different areas and temporally averaging over at least two different times including the steps of:

recording UnCorrected Deformation data (UCD) of movement data in the monitored area;

spatially averaging the UnCorrected Deformation data (UCD) to produce Background Deformation data ($BD_x$) on a first scale x;

temporally averaging the Background Deformation data ($BD_x$) to produce Background Deformation averaged data ($BDa_x$) on the first scale x;

subtracting the Background Deformation data ($BD_x$) from the UnCorrected Deformation data (UCD) to produce Background Subtracted Deformation data ($BSD_x$) on the first scale x;

spatially averaging the Background Deformation averaged data ($BDa_x$) to produce a Background Deformation data ($BD_y$) on a second scale y;

temporally averaging the Background Deformation data ($BD_y$) on the second scale y to produce Background Deformation averaged data ($BDa_y$) on the second scale y;

subtracting the Background Deformation data ($BD_y$) on the second scale y from the Background Deformation averaged data ($BDa_x$) on the first scale x to produce Background Subtracted Deformation data ($BSD_y$) on the second scale y;

deriving a correction factor from the Background Deformation averaged data ($BDa_y$) on the second scale y;

applying the correction factor to produce Corrected Background Deformation averaged data (CBDa); and using the Corrected Background Deformation averaged data (CBDa) with the Background Subtracted Deformation data ($BSD_x$) on the first scale x and the Background Subtracted Deformation data ($BSD_y$) on the second scale y to produce Multiscale Deformation data (MSD); and producing a deformation map from the Multiscale Deformation data (MSD) which shows movement in the monitored area.

The data processing is preferably interferometric and the deformation map is preferably an interferometric deformation map.

The method may be extended by:

spatially averaging the Background Deformation averaged data ($BDa_y$) on the second scale y to produce Background interferometric Deformation data ($BD_z$) on a third scale z;

temporally averaging the Background Deformation data ($BD_z$) on the third scale z to produce Background Deformation averaged data ($BDa_z$) on the third scale z;

subtracting the Background Deformation data ($BD_z$) on the third scale z from the Background Deformation averaged data ($BDa_y$) on the second scale y to produce Background Subtracted Deformation data ($BSD_z$) on the third scale z;

deriving the correction factor from the Background Deformation averaged data ($BDa_z$) on the third scale z; and also using the Background Subtracted Deformation data ($BSD_z$) on the third scale z to produce the Multiscale interferometric Deformation data (MSD).

The step of spatially averaging may be by spatial selection. Spatial selection may be by sub-sampling.

The step of temporal averaging is suitably by temporal step averaging. The temporal step averaging may step across a range from every scan to 24 hours, or any time step in between including but not limited to a minute, a few minutes, 1 hour, 2 hours, 6 hours 12 hours and 18 hours. There may be a time gap between steps of a few minutes, 1 hour, 2 hours, 4 hours or more, or any time in between.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
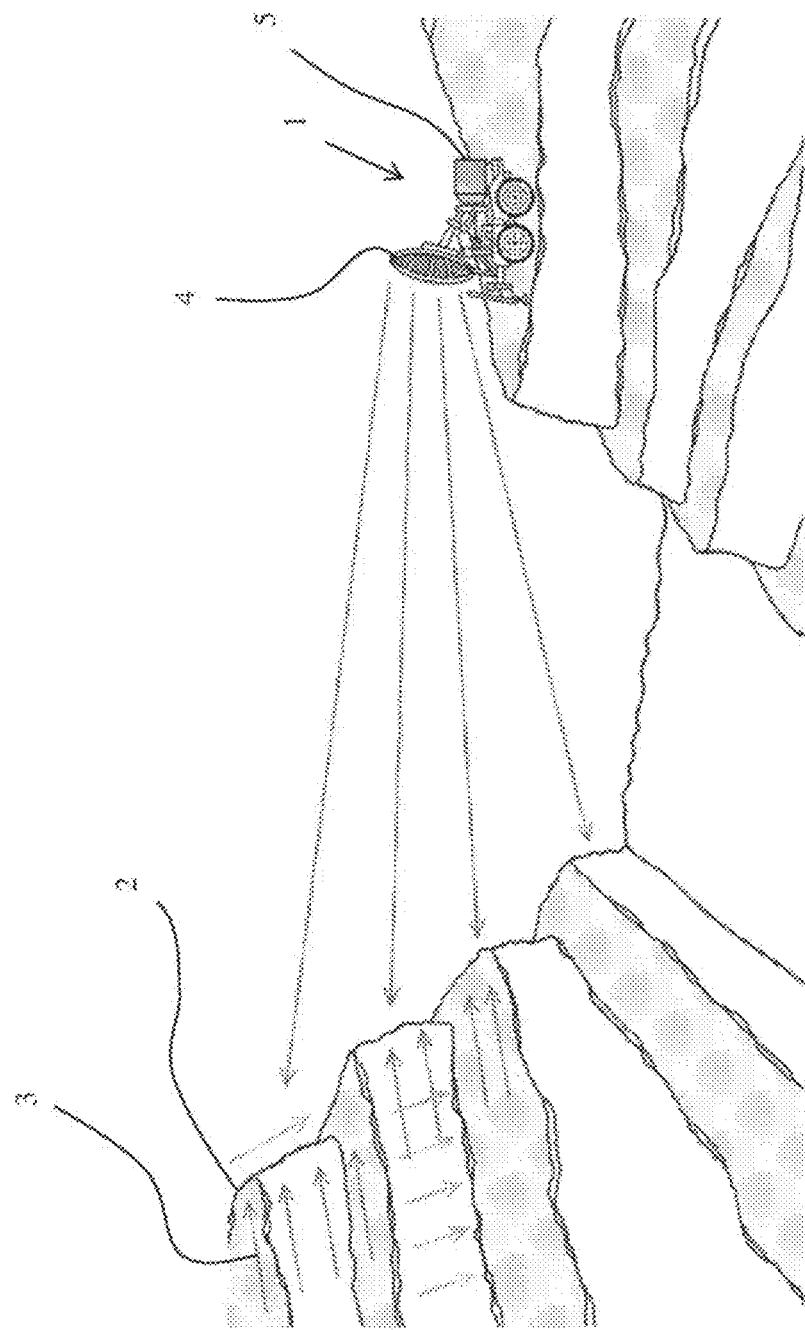
FIG. 1 is a sketch of a slope stability monitoring apparatus producing improved deformation maps.

Embodiments of the present invention reside primarily in a method of multiscale processing for atmospheric correction of slope monitoring deformation data. Accordingly, the method steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is shown a slope stability monitoring apparatus 1. The slope stability monitoring apparatus may be Radar apparatus or a Lidar apparatus. For ease of explanation the following explanation of an embodiment relates to interferometric Radar. The invention could be applied to other slope stability monitoring apparatuses including Radars and Lidars that are 2D, 3D, airborne, spaceborne, ground-based, static, mobile, real aperture, synthetic aperture, Doppler, time of flight or interferometric.

The apparatus 1 is directed at a slope 2, at least a part of which may be at risk of movement, such as the movement depicted by the arrows 3. The apparatus 1 comprises a radar dish 4 that is moved to scan a signal across the slope. The reflected radar signal is analysed for phase difference from which movement data is derived. The process is known as interferometric signal processing and is described in PCT/AU2001/001570.

The interferometric signal processing is performed in a processor which may be conveniently located on the apparatus in a box 5 together with a power supply and other equipment for operation of the radar. The result of the interferometric signal processing is rendered as a movement map which shows which part of the wall is moving and in what direction. The processor may also generate alarms to give warning of significant movement that may lead to slope failure.

One problem with the apparatus of FIG. 1 is that there may be apparent movement which is in fact due to non-wall influences. One such influence is change in atmospheric conditions. The apparatus corrects the interferometric signal processing to compensate for apparent movement that is not-wall related.

By way of general explanation, the data from a radar may include measurements of fast moving small areas (FSA), slow moving small areas (SSA), slow moving large areas (SLA) and, rarely, fast moving large areas (FLA). Subtracting a spatial average from the incoming data primarily preserves FSA and most SSA; while suppressing the effect of the short term spatial character in the atmosphere. The spatial averaged stream will preserve FLA, SLA and atmospheric effects. Temporal averaging the spatial averaged stream preserves SLA and bulk atmospheric effects while suppressing short term spatial atmospheric events and FLA. The background subtracted stream can also be temporally averaged and when it is added to the temporally averaged data a dataset is produced from which the bulk correction can be easily calculated. A correction factor is calculated and applied to the data to produce a stream in which SLA is preserved and the bulk atmosphere suppressed. For simplicity this can be added to the background subtracted stream so that a single data stream contains SLA, FSA and SSA with little contamination from the atmosphere or other effects such as instrument drift. The corrected data is then used to produce improved deformation maps to provide early warning of impending slope failure. FLA events are rare and only occur after a blast or a wall failure which will increase the mines alertness so that the residual FLA signal due to likely non-uniformity and rapid movement will still be apparent.

Figure 2:
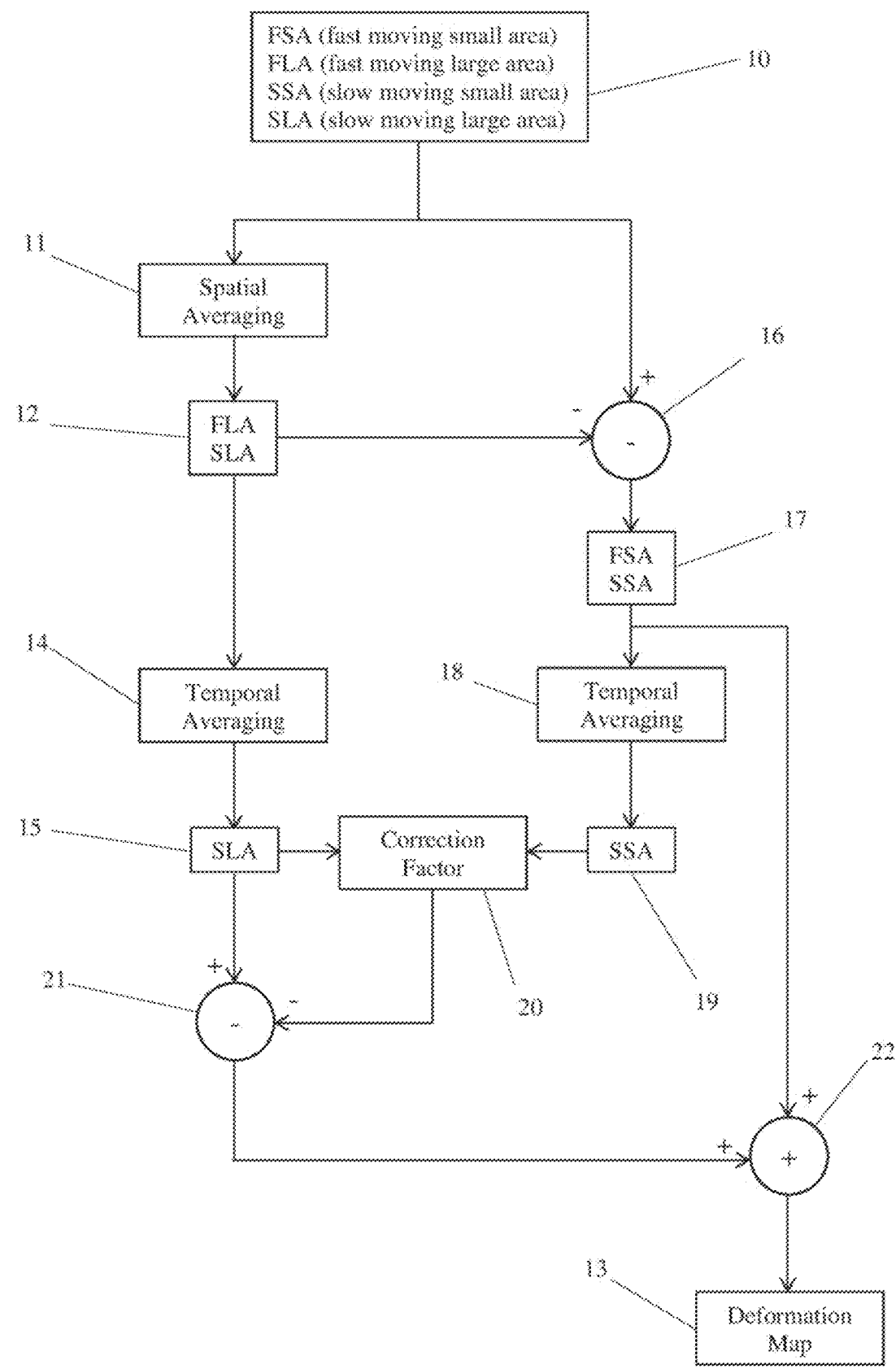
FIG. 2 is a conceptual flow chart of a bulk correction of slow deformation data and a spatial correction of fast deformation data obtained from a Radar or Lidar.

The process is summarised in FIG. 2. The radar data 10 is spatially averaged 11 to produce a dataset preserving FLA and SLA 12 which uses temporal averaging 14 to obtain SLA data 15. The dataset 12 is subtracted 16 from the radar data 10 to produce a dataset containing FSA and SSA 17 which is also temporally averaged 18 to obtain SSA 19. The SSA 19 and SLA 15 data is used to calculate a correction factor 20 that corrects for bulk effects, particularly atmospheric changes and instrument drift. The correction factor 20 is subtracted 21 from the SLA data 15. This corrected data is combined 22 with FSA and SSA 17 to provide a dataset from which improved deformation maps are produced using the techniques described in the earlier patents mentioned previously, the content of which are incorporated herein by reference. These deformation maps 13 are greatly improved by having bulk effects, such as atmospheric drift and instrument drift, suppressed.

One process for the determination of the correction factor 20 is that SSA and SLA data is added and the total is plotted against range from the radar to the voxel from which the data is recorded. The slope of a line of best fit is the bulk correction factor and the y-intercept accounts for drift errors in the radar. The process is described in detail by reference to the embodiments which follow.

Figure 3:
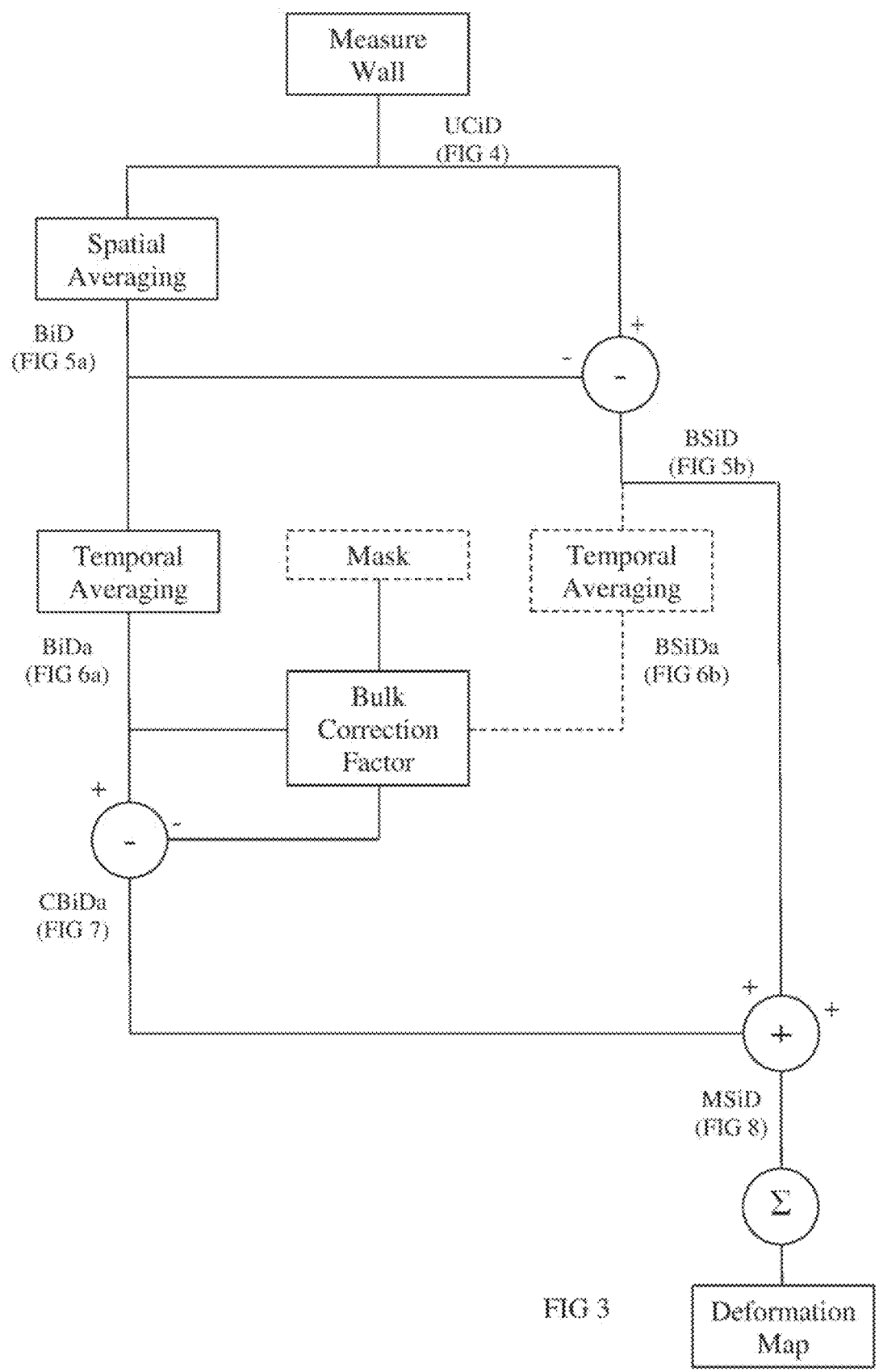
FIG. 3 shows a practical implementation of the concept of FIG. 2.

A practical implementation of the process of FIG. 2 is shown in FIG. 3 with example data provided in the following figures. The data is taken from a GroundProbe® SSR-FX radar. The SSR-FX monitors a thin vertical stripe on the wall that is rotated left-to-right like a fan and does not move up-and-down like a spotlight. The SSR-FX can scan 180 degrees in less than two minutes and processed data is immediately available. It is a real aperture radar which gives broad area coverage, using a pixel resolution of over 1.4 million pixels per scan, updated at least every two minutes, with a maximum diameter of 5.6 km. To indicate that this specific embodiment is applied to interferometric data the data labels are amended to include the interferometric reference. Thus UnCorrected Deformation (UCD) data becomes UnCorrected interferometric Deformation (UCiD) data, on so forth.

The process described herein is not limited to interferometrically obtained data sets. For instance, the data sets could be range data obtained from a Lidar device rather than the phase data obtained from a Radar device. A Lidar can also generate phase data which can be processed interferometrically.

Referring to FIG. 3, a wall (or slope) is monitored using slope stability radar or slope stability Lidar and uncorrected interferometric deformation (UCiD) data is collected each scan. The uncorrected interferometric deformation (UCiD) data is a stream of phase data. Interferometric phase is the phase change for any pixel between scans. Interferometric phase is converted to UCiD by multiplying by $\lambda/4\pi$. The data is referred to as "uncorrected" to make clear that no attempt has been made to make any bulk correction, whether for the atmosphere or otherwise. However it does not mean that some degree of pre-processing may not have occurred. Indeed, most Radar and Lidar equipment processes the raw data stream. In addition, specific implementations may involve additional proprietary pre-processing before application of the method described herein.

The uncorrected interferometric deformation (UCiD) data may be processed in the manner described in the earlier patents mentioned above to produce deformation maps, such as shown in the figures. Essentially the UCiD data is summed to get uncorrected deformation (UCD). This is a single scale process without temporal or spatial filtering and without bulk correction. UCD shows the cumulative result of both real wall movements and bulk (such as atmospheric) changes across the image time period. The process described in detail below is a method of correcting for short-term spatial atmospheric (like) effects and longer-term bulk atmospheric (like) effects.

Figure 4:
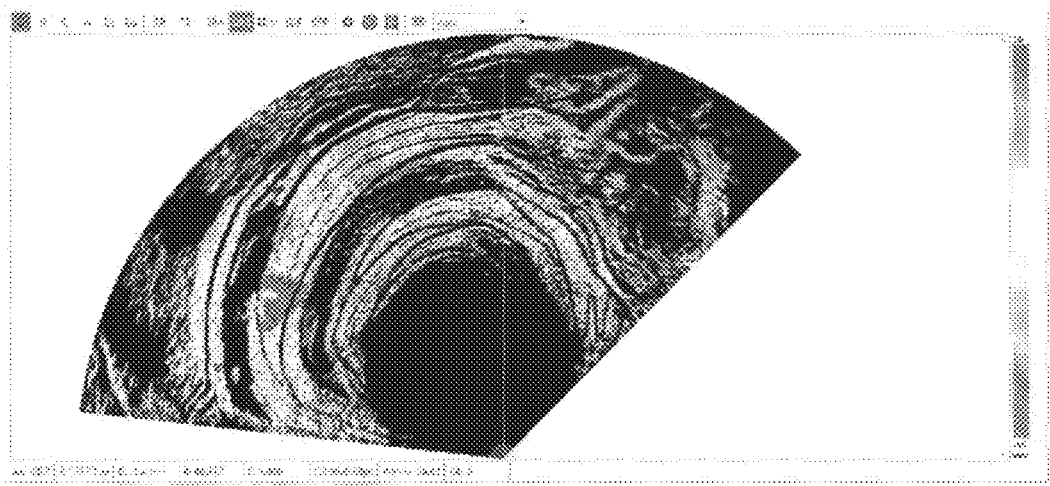
FIG. 4 shows uncorrected deformation data (UCD)

In the following figures the deformation maps show cumulative data rather than a single scan. This is necessary so that wall movements that emerge over time can be visualized. For ease of explanation the detailed process is described by reference to each scan, but the figures exemplifying the process are cumulative data over a period of approximately 3.5 days. For example, the data in FIG. 4 is actually uncorrected deformation (UCD) data not uncorrected interferometric deformation (UCiD) data.

The UCiD data is spatially averaged by a process described in greater detail below by reference to FIG. 5a to obtain background interferometric deformation (BiD) data. The BiD data is then temporally averaged to produce background interferometric deformation averaged (BiDa) data, a cumulated sample of which is shown in FIG. 6a.

There may also be an optional ambiguity handling process which incorporates an ambiguity detector and spatial unwrapper. One approach for ambiguity handling is described in International Publication number WO2007/009175 titled Interferometric Signal Processing.

Figure 5B:
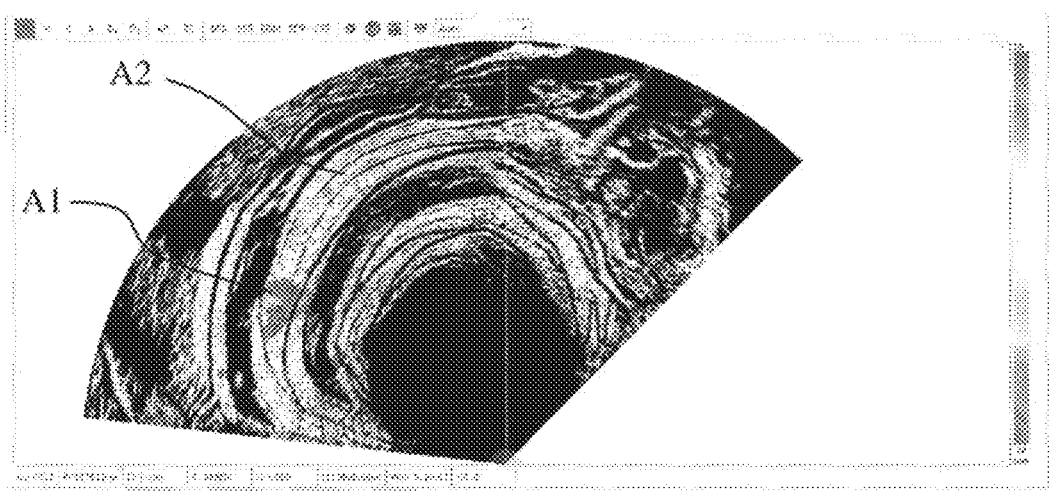
FIG. 5b shows background subtracted deformation data (BSD)
Figure 6A:
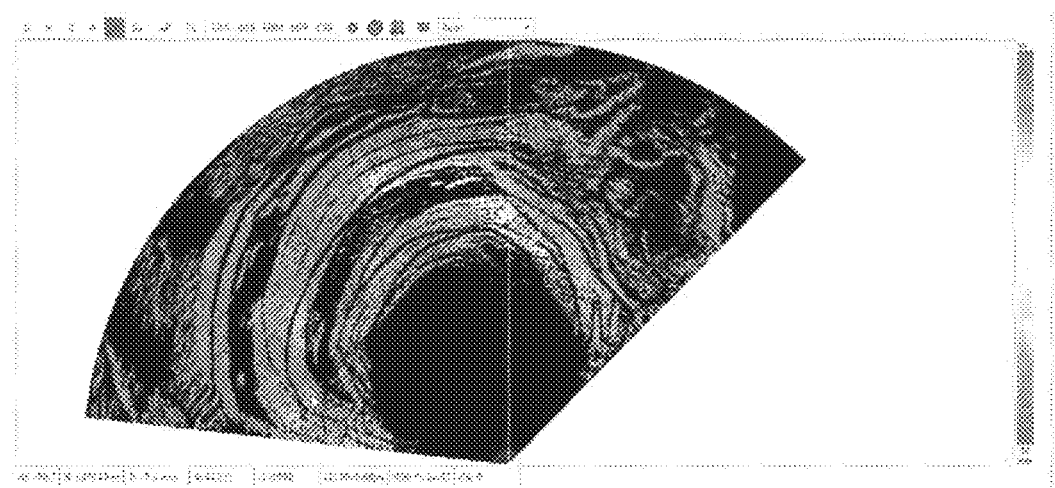
FIG. 6a shows temporally averaged background deformation data (BDa)
Figure 6B:
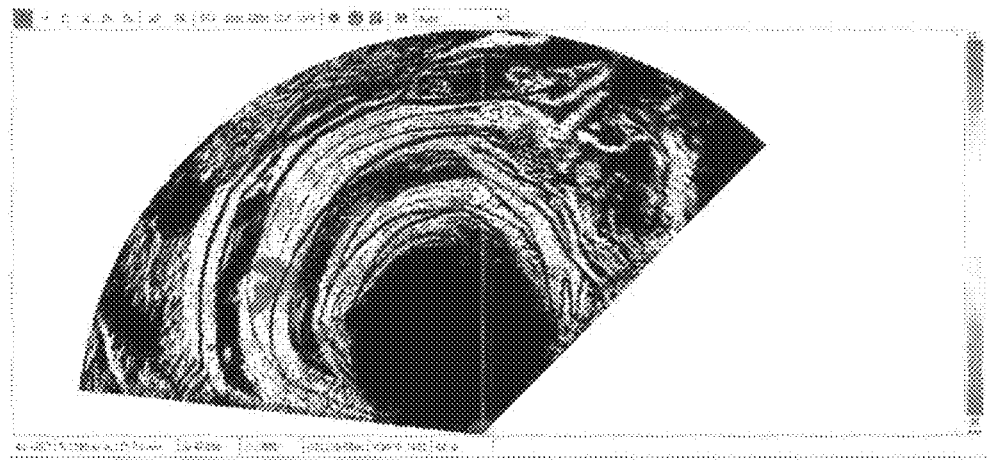
FIG. 6b shows temporally averaged background subtracted deformation data (BSDa)

The BiD data is subtracted from the uncorrected interferometric deformation (UCiD) data to produce background subtracted interferometric deformation (BSiD) data. A cumulated sample of BSiD data is shown in FIG. 5b. The BSiD data may be temporally averaged to produce background subtracted interferometric deformation averaged (BSiDa) data, a cumulated sample of which is shown in FIG. 6b. Although the step of temporally averaging the BSiD data is optional it will usually be performed because it has been found that in most cases the Bulk Correction Factor obtained from BiDa and BSiDa generates a greater improvement than obtaining the Bulk Correction Factor from BiDa alone.

The BiDa data and the BSiDa data are used to calculate a bulk correction factor as described above. To assist with this step it is optional to apply a mask as described below.

Figure 7:
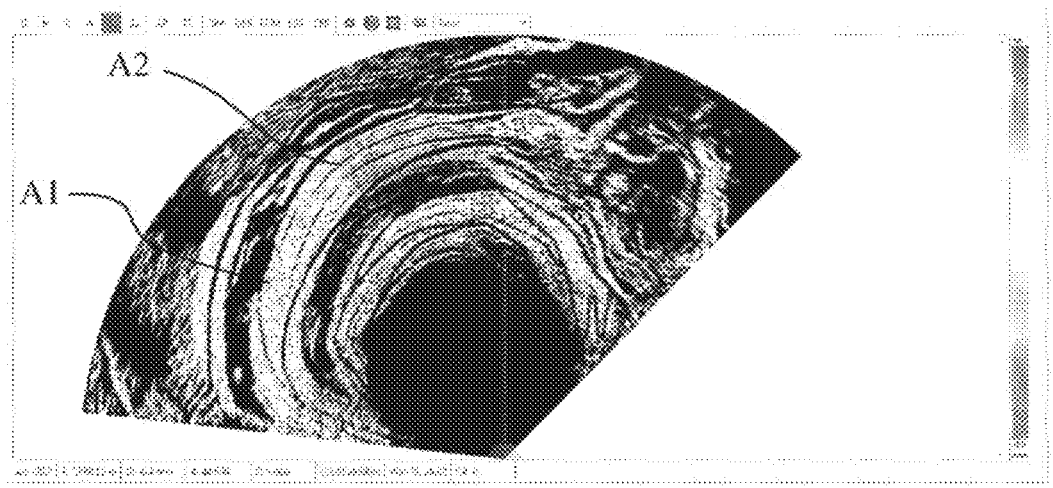
FIG. 7 shows corrected background deformation averaged data (CBDa)

The bulk correction factor is subtracted from the BiDa data to obtain corrected background interferometric deformation averaged (CBiDa) data. An example of cumulated CBiDa data is shown in FIG. 7.

Figure 8:
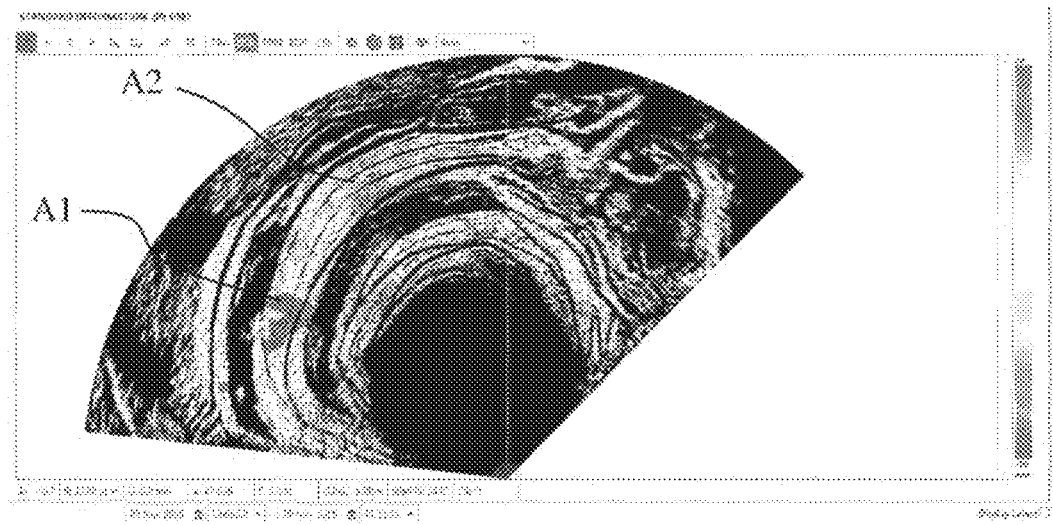
FIG. 8 shows a corrected deformation map (MSD)

The CBiDa data is added to the BSiD data to produce multiscale interferometric deformation (MSiD) data. An example of cumulated MSiD data is shown in FIG. 8. The MSiD data is processed according to one of the methods described in the patent applications referenced in the background section above to produce improved deformation maps. By way of example, FIG. 4 shows a deformation map without correction and FIG. 8 shows the same data after the processing of FIG. 3. The lower degree of atmospheric clutter in FIG. 8 means that a lower alarm threshold can be set without increasing the false alarm rate. Also, the alarm threshold configuration is simpler because a constant spatial atmospheric clutter level is achieved across the wall surface image.

The first step, as shown in FIG. 2, is to spatially average the uncorrected interferometric deformation (UCiD) data. A cumulative sample of UCiD data (UCD) is shown in FIG. 4. Spatial averaging may occur over different volumes depending on the requirement for the data being corrected. That is, the value for each voxel in the data set is calculated as the average of the values of all voxels in a spherical window to produce Background interferometric Deformation (BiD), as shown in FIG. 5a (as cumulated data). The inventors have found that a suitable volume for many situations is a sphere with a diameter of 200 m or 400 m or 800 m. Other suitable volumes are a sphere with 150 m diameter or all data in a sphere with 5600 m diameter. Although reference is made to averaging a volume containing multiple data voxels, it will be appreciated that for 2D radar the data will be in pixels and the spatial averaging will be over an area.

The spatial averaging process is a sliding process in the sense that a value for each voxel is obtained by averaging the voxels surrounding that voxel and then the process moves to the next voxel and repeats. The number of voxels in the data set remains the same. The window is truncated by the data edge.

Figure 5A:
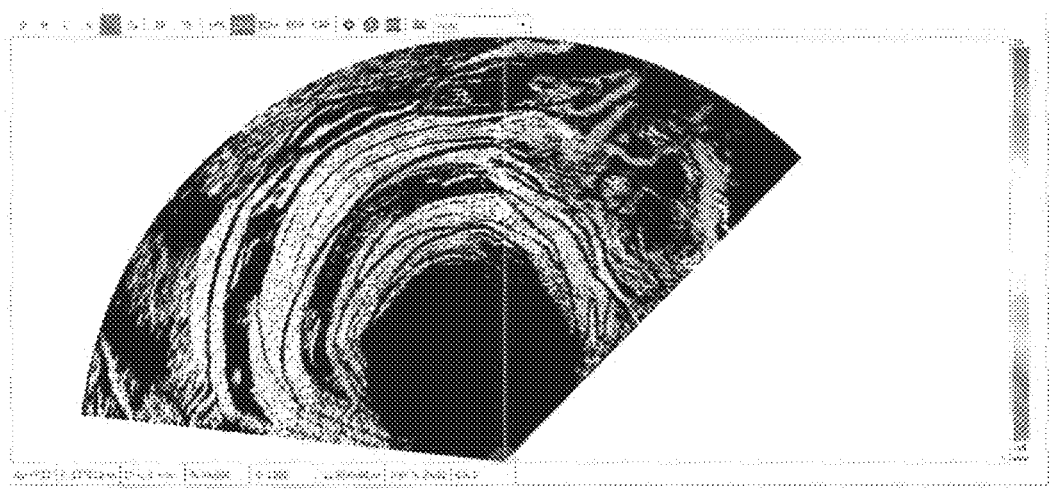
FIG. 5a shows background (spatially averaged) deformation data (BD)

FIG. 5a shows the spatially averaged background interferometric deformation (BiD) cumulated to produce background deformation (BD). It is evident from a review of FIG. 5a that the classically processed data shown in FIG. 4 shows more deformation detail. The deformation map of FIG. 5a will show large, slow moving areas but small moving areas are suppressed by averaging out. Comparing FIG. 5a with FIG. 4 shows that background deformation captures the spatial character of atmosphere while ignoring the major components of wall movements.

Background interferometric Deformation (BiD) is subtracted from uncorrected interferometric deformation (UCiD) to create Background Subtracted interferometric Deformation (BSiD) (FIG. 5b). As nearby voxels tend to experience a similar atmosphere, BSiD has most atmospheric effects removed. The deformation in small fast moving areas will come through well into BSiD. See for example movement at A1 in FIG. 5b. Large slow moving areas such as at A2 will be suppressed by the background subtraction and not come through as well into BSiD. This is because the movement is slow and large and on the order of the spatial averaging window size. BSiD shows other small fast moving areas which are sometimes located within larger, slower moving areas that may not be clear in background subtracted deformation (BSD) or background deformation (BD) until it has been temporal averaged and had a bulk correction applied, as described below.

Another phase of the process is to conduct temporal averaging. Temporal averaging is performed by acquiring data for a period of time and sliding the averaging window forward in time after an initial period of data is acquired. The inventors have found that a suitable time window is 24 hours. Other time windows may also be suitable in particular circumstances as described below. Thus the time window may be only 1 hour or even shorter. FIG. 6a shows the time averaged spatially averaged background interferometric data (BiDa), shown as a cumulated example.

In the same way BiDa was created by time averaging BiD, BSiDa is created by time averaging BSiD. FIG. 6b shows the time averaged spatially averaged background interferometric data (BiDa).

Figure 9:
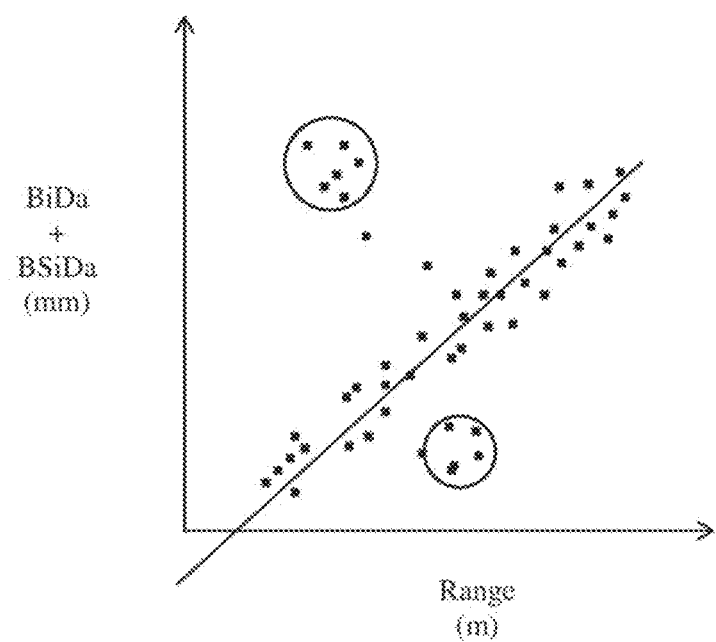
FIG. 9 shows a process for determining Bulk Correction Factor.

A Bulk Correction Factor is determined from BiDa and BSiDa. A preferred process is depicted in FIG. 9. BiDa and BSiDa data points at each range management are added and plotted against the range of the data point. Effectively this is plotting only the slow movements against range. The slope of the line is the Bulk Correction Factor. If there is any offset all or some components of it may be due to instrument effects.

In case there are some outlier points, as shown in FIG. 9, these may be excluded by an optional manual or automatic masking process, as depicted in FIG. 3. A Manual Exclusion Mask may be selected by a user utilising a graphical user interface to exclude regions such as shown circled in FIG. 9. In this embodiment the identified data points are excluded from the determination of the Bulk Correction Factor. An alternate manual process is for a user to select a Manual Inclusion Mask of areas of the wall that are likely to be stable. This is a similar process to the current or classic user process of selecting and setting stable reference areas (SRAs). Pixels within the Manual Inclusion Mask that also have good amplitude and good coherence and which have previously not moved too much are deemed to be good. BiDa and BSiDa on those pixels is most likely due to changes in the bulk refractive index of the atmosphere. An automatic process may automatically select in an Automatic Inclusion Mask a section of the slope that has moved, say, less than 2 mm in, say, 2 days.

Once the Bulk Correction Factor is determined it is subtracted from the BiDa data to produce CBiDa data, as mentioned above. The BSiD data is added to the CBiDa data to produce Multiscale interferometric data from which deformation maps are constructed free from distortion caused by bulk factors such as atmospheric and instrument drift. A corrected deformation map shown in FIG. 8.

A benefit of adding BSiD and CBiDa is that a clearer image is produced. A similarly clear image may be obtained by adding BiDa and BSiDa.

An alternate to spatial averaging as described in the above embodiment is spatial selection. Spatial averaging by spatial selection is done by selecting stable reference areas and using these as an approximation to a larger area. The technique could also be referred to as spatial sub-sample averaging. The technique of selecting stable reference areas is well known to users of this monitoring technology and is a manual method for obtaining one or more spatial averages, in one or more locations within the selected scan area. Estimating a single bulk spatial correction by combining all the stable reference area estimates is the simplest spatial averaging approach, however using multiple regions to create sub-sampled averages of the scan area obtain a better spatial estimate. Both spatial selection averaging methods can also be automated by selecting areas that are statistically high quality measurements.

An alternative to temporal averaging as described in the above embodiment is temporal step averaging. In temporal step averaging a block of data is averaged and then the process steps to a next block of data, as opposed to the sliding window approach described earlier. The size of the block and the time between blocks is set to achieve a desired duty cycle to suit available processing power. The averaging method applied to temporal step averaging could suitably be a mean, median or mode or likewise could be a temporal sub-sampling that has interferometric or difference processing applied.

Figure 10:
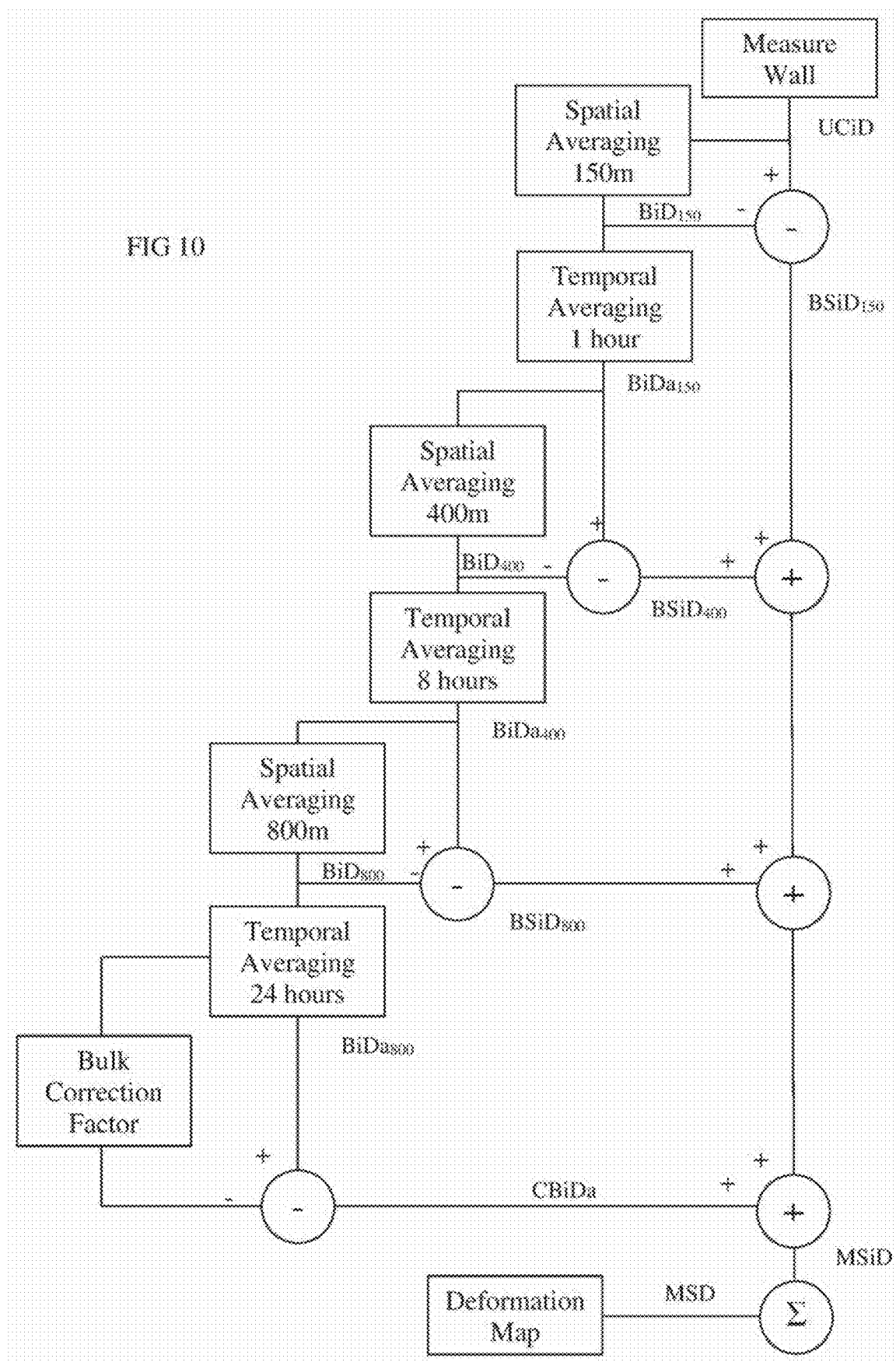
FIG. 10 shows a four-scale process.

The example described above uses a two scale process with a single spatial averaging volume and a single time window. The invention may be extended to a multiscale process with multiple different averaging volumes and different time windows. Turning now to FIG. 10, there is shown one such alternate process of multiscale processing for bulk correction of deformation maps. As with the method of FIG. 2 the processing commences with uncorrected interferometric deformation (UCiD) data collected from a wall or slope using a slope stability radar or slope stability Lidar. The UCiD data is first spatially averaged over an area of, say, 150 m diameter to produce background interferometric data ($BiD_{150}$). This data is then temporally averaged for 1 hour to produce $BiDa_{150}$ data. The $BiD_{150}$ data is subtracted from the uncorrected interferometric deformation (UCiD) data to produce background subtracted interferometric deformation ($BSiD_{150}$) data. Each of these processes are as described above.

The process is repeated for different scales, for example areas with diameters of, say, 400 m and 800 m and time scales of, say, 8 hours and 24 hours. The process depicted in FIG. 10 uses areas with diameters of 150 m, 400 m and 800 m for spatial averaging but other areas with diameters of 100 m, 200 m 300 m, 500 m, 600 m, 700 m or diameters in between or greater will also be suitable in certain situations. The multiscale process of FIG. 9 is also not limited to particular time scales for temporal averaging but times of 2 hours, 3 hours, 5 hours, 6 hours, 7 hours or times in between or greater will also be suitable in certain situations.

The method of producing deformation maps significantly reduces atmospheric effects while preserving important movement data. It presents a significant safety improvement over the known techniques.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A slope stability monitoring apparatus comprising:
   a Radar or Lidar that records movement data of an observed slope or wall;
   a processor that:
      corrects the movement data for apparent movement that is not wall or slope related by:
      recording UnCorrected Deformation data (UCD) of movement data in the monitored area;
      spatially averaging the UnCorrected Deformation data (UCD) to produce Background Deformation data (BD) with minimal effect from small area movement;
      temporally averaging the Background Deformation data (BD) to produce Background Deformation averaged data (BDa) with primary effect from slow moving large areas;
      subtracting the Background Deformation data (BD) from the UnCorrected Deformation data (UCD) to produce Background Subtracted Deformation data (BSD) with minimal effect from large area movement;
      deriving a correction factor from the Background Deformation averaged data (BDa);
      applying the correction factor to produce Corrected Background Deformation averaged data (CBDa);
      using the Corrected Background Deformation averaged data (CBDa) with the Background Subtracted Deformation data (BSD) to produce Multiscale Deformation data (MSD);
   processes the Multiscale Deformation data to produce deformation maps indicative of movement of the observed slope or wall over time; and
   generates alarms indicating wall or slope movement above a threshold; and
   a display that displays the deformation maps and alarms.

2. The slope stability monitoring apparatus of claim 1 wherein the movement data is processed interferometrically and the deformation maps are interferometric deformation maps.

3. A method of producing a deformation map of a monitored area including the steps of:
   recording UnCorrected Deformation data (UCD) of movement data in the monitored area;

spatially averaging the UnCorrected Deformation data (UCD) to produce Background Deformation data (BD) with minimal effect from small area movement;

temporally averaging the Background Deformation data (BD) to produce Background Deformation averaged data (BDa) with primary effect from slow moving large areas;

subtracting the Background Deformation data (BD) from the UnCorrected Deformation data (UCD) to produce Background Subtracted Deformation data (BSD) with minimal effect from large area movement;

deriving a correction factor from the Background Deformation averaged data (BDa);

applying the correction factor to produce Corrected Background Deformation averaged data (CBDa);

using the Corrected Background Deformation averaged data (CBDa) with the Background Subtracted Deformation data (BSD) to produce Multiscale Deformation data (MSD); and producing a deformation map from the Multiscale Deformation data (MSD) which shows movement in the monitored area.

4. The method of claim 3 wherein the deformation map is an interferometric deformation map produced from interferometric movement data.

5. The method of claim 3 further including temporally averaging the Background Subtracted Deformation data (BSD) to produce Background Subtracted Deformation averaged data (BSDa) with primary effect from slow moving small areas; and deriving the correction factor from the Background Deformation averaged data (BDa) and the Background Subtracted Deformation averaged data (BSDa).

6. The method of claim 3 wherein the step of deriving the correction factor may include applying a mask to remove outlier data from the Background Deformation averaged data (BiDa) and/or Background Subtracted Deformation averaged (BSDa) data.

7. The method of claim 3 wherein the method is recursive with multiple steps of spatial averaging with each spatial average averaging over a different area, and multiple steps of temporal averaging with each temporal average occurring over a different time period.

8. The method of claim 3 wherein the step of spatially averaging is by spatial selection.

9. The method of claim 8 wherein spatial selection is by sub-sampling.

10. The method of claim 3 wherein the step of temporal averaging is by temporal step averaging.

11. The method of claim 10 wherein temporal step averaging steps across a range selected from: every scan; a minute; a few minutes; one hour; 2 hours; 6 hours; 12 hours; 18 hours; 24 hours.

12. The method of claim 11 wherein there is a time gap between steps selected from: a minute; a few minutes; 1 hour; 2 hours; 4 hours.

13. A method of producing a deformation map of a monitored area by spatially averaging over at least two different areas and temporally averaging over at least two different times including the steps of:

recording UnCorrected Deformation data (UCD) of movement data in the monitored area;

spatially averaging the UnCorrected Deformation data (UCD) to produce Background Deformation data ($BD_x$) on a first scale x;

temporally averaging the Background Deformation data ($BD_x$) to produce Background Deformation averaged data ($BDa_x$) on the first scale x;

subtracting the Background Deformation data ($BD_x$) from the UnCorrected Deformation data (UCD) to produce Background Subtracted Deformation data ($BSD_x$) on the first scale x;

spatially averaging the Background Deformation averaged data ($BDa_x$) to produce a Background Deformation data ($BD_y$) on a second scale y;

temporally averaging the Background Deformation data ($BD_y$) on the second scale y to produce Background Deformation averaged data ($BDa_y$) on the second scale y;

subtracting the Background Deformation data ($BD_y$) on the second scale y from the Background Deformation averaged data ($BDa_x$) on the first scale x to produce Background Subtracted Deformation data ($BSD_y$) on the second scale y;

deriving a correction factor from the Background Deformation averaged data ($BDa_y$) on the second scale y;

applying the correction factor to produce Corrected Background Deformation averaged data (CBDa); and using the Corrected Background Deformation averaged data (CBDa) with the Background Subtracted Deformation data ($BSD_x$) on the first scale x and the Background Subtracted Deformation data ($BSD_y$) on the second scale y to produce Multiscale Deformation data (MSD); and producing a deformation map from the Multiscale Deformation data (MSD) which shows movement in the monitored area.

14. The method of claim 13 wherein the data processing is interferometric and the deformation map is an interferometric deformation map.

15. The method of claim 14 wherein the step of temporal averaging is by temporal step averaging.

16. The method of claim 15 wherein temporal step averaging steps across a range selected from: every scan; a minute; a few minutes; one hour; 2 hours; 6 hours; 12 hours; 18 hours; 24 hours.

17. The method of claim 15 wherein there is a time gap between steps selected from: a minute; a few minutes; 1 hour; 2 hours; 4 hours.

18. The method of claim 13 further including the steps of:

spatially averaging the Background Deformation averaged data ($BDa_y$) on the second scale y to produce Background interferometric Deformation data ($BD_z$) on a third scale z;

temporally averaging the Background Deformation data ($BD_z$) on the third scale z to produce Background Deformation averaged data ($BDa_z$) on the third scale z;

subtracting the Background Deformation data ($BD_z$) on the third scale z from the Background Deformation averaged data ($BDa_y$) on the second scale y to produce Background Subtracted Deformation data ($BSD_z$) on the third scale z;

deriving the correction factor from the Background Deformation averaged data ($BDa_z$) on the third scale z; and also using the Background Subtracted Deformation data ($BSD_z$) on the third scale z to produce the Multiscale interferometric Deformation data (MSD).

19. The method of claim 13 wherein the step of spatially averaging is by spatial selection.

20. The method of claim 19 wherein spatial selection is by sub-sampling.

* * * * *